United States Patent
Meyer et al.

(10) Patent No.: US 8,297,846 B2
(45) Date of Patent: Oct. 30, 2012

(54) BEARING ARRANGEMENT FOR A PIVOT BEARING

(75) Inventors: Mario Meyer, Langenhagen (DE); Holger Winkler, Braunschweig (DE)

(73) Assignee: Mettler-Toledo Garvens GmbH, Giessen (DE)

( * ) Notice: Subject to any disclaimer, the term of this patent is extended or adjusted under 35 U.S.C. 154(b) by 558 days.

(21) Appl. No.: 12/362,372

(22) Filed: Jan. 29, 2009

(65) Prior Publication Data

US 2009/0232437 A1   Sep. 17, 2009

(30) Foreign Application Priority Data

Feb. 8, 2008   (DE) .................. 10 2008 008 095

(51) Int. Cl.
*F16C 13/00* (2006.01)
*B65G 13/02* (2006.01)
*B65G 23/44* (2006.01)
*B65G 23/04* (2006.01)

(52) U.S. Cl. ........ 384/418; 198/782; 198/813; 198/835; 193/37

(58) Field of Classification Search ............ 193/37; 198/782, 813, 835; 384/416, 418, 419, 428, 384/438, 442, 443, 444
See application file for complete search history.

(56) References Cited

U.S. PATENT DOCUMENTS

| | | | |
|---|---|---|---|
| 1,379,818 A | 5/1921 | Hinnekens | |
| 2,593,089 A * | 4/1952 | Barry .......................... | 193/35 R |
| 3,053,368 A * | 9/1962 | Klahn ......................... | 193/35 R |
| 3,360,063 A * | 12/1967 | Hausenblas et al. ........... | 180/9.1 |
| 4,345,678 A * | 8/1982 | Garnett ....................... | 193/35 R |
| 5,174,435 A | 12/1992 | Dorner et al. | |
| 5,457,520 A * | 10/1995 | Schell et al. .................. | 399/117 |
| 5,659,851 A * | 8/1997 | Moe et al. ..................... | 399/165 |
| 5,895,153 A | 4/1999 | Aslam et al. | |
| 6,134,406 A * | 10/2000 | Moe et al. ..................... | 399/165 |
| 7,040,489 B2 * | 5/2006 | Zemlin et al. ................. | 209/691 |
| 7,155,144 B2 * | 12/2006 | Atwood et al. ............... | 399/165 |
| 2005/0145465 A1 * | 7/2005 | Ertel et al. ................. | 198/860.1 |

FOREIGN PATENT DOCUMENTS

| | | |
|---|---|---|
| DE | 6 89 10 720.9 U1 | 12/1989 |
| DE | 695 04 756 T2 | 4/1999 |
| DE | 102 14 828 A1 | 10/2003 |
| DE | 10 2006 038 185 B3 | 2/2008 |
| DE | 20 2006 020 227 U1 | 2/2008 |
| GB | 1 450 239 A | 9/1976 |
| GB | 2 093 424 A | 9/1982 |
| GB | 2 126 973 A | 4/1984 |
| JP | 2002188700 A | 5/2002 |

* cited by examiner

*Primary Examiner* — Thomas R Hannon
*Assistant Examiner* — Adam D Rogers
(74) *Attorney, Agent, or Firm* — Schwabe, Williamson & Wyatt, P.C.

(57) ABSTRACT

In a bearing arrangement for a pivot bearing (7, 7") of a roll, on which the conveyor belt (8) revolves, bearing receiving regions (11, 12) of lateral bearing carriers (6) are configured such that they enclose the pivot bearings (7, 7") only partially and do not jut into the orbit of the conveyor belt (8), wherein the pivot bearings (7, 7") are held in the bearing receiving regions (11, 12) thereof by the revolving conveyor belt (8).

10 Claims, 5 Drawing Sheets

BEARING ARRANGEMENT FOR A PIVOT BEARING

CROSS REFERENCE TO RELATED APPLICATIONS

The present application claims international priority under 35 U.S.C. §119 to co-pending German Patent Application No. 102008008095.0 filed 8 Feb. 2008, entitled Lageranordnung für ein Drehlager," the entire content and disclosure of which is hereby incorporated by reference in its entirety.

BACKGROUND

The invention relates to a bearing arrangement for a pivot bearing of a roll that can be rotated about a rotation axis, comprising a bearing carrier extending orthogonally to the rotation axis and having a bearing receiving region azimuthally enclosing the pivot bearing in the region of the radially outer circumference thereof, and comprising an element revolving in engagement with the circumference of the roll during the rotation thereof.

Bearing arrangements of this type occur particularly in conveyor systems, in which the rolls are used to support a conveyor belt continuously revolving about at least two mutually spaced rolls. Frequently, these conveyor systems are made of a plurality of sections disposed next to one another in the conveying direction, in which each such conveyor belt revolves between a feed-side roll and a discharge-side roll. At the transfer point between a section preceding in the conveying direction and a section following in the conveying direction, it is necessary for certain applications to use the smallest possible diameters for the roll of the preceding section on the discharge side and the roll of the subsequent section on the feed side, the rolls adjoining each other at the transfer point, in order to keep the transition region between the effectively conveying strands of the two mutually adjoining conveyor belts small.

It is known to configure the bearing holders of the pivot bearings disposed in the region of the two axial ends of the roll as closed recesses in the bearing carriers such that the bearing holder completely encloses the radially outer circumference of the pivot bearing. In this configuration of the bearing arrangement, the space requirement thereof is at least as large as the sum of the diameter of the pivot bearing and the extension of the bearing carrier enclosing the pivot bearing, said extension being orthogonal to the rotation axis. In order to ensure that the bearing carriers of the feed-side roll and of the discharge-side roll opposing each other at the transfer points do not cause any undesirable distance, they must not protrude over the radius of the rolls there, which means that the diameter of the pivot bearings must be accordingly small. The latter, however, is disadvantageous for the service life of the pivot bearings.

BRIEF DESCRIPTION OF DRAWINGS

In the following description, the invention is described in more detail based on example with reference to the drawing. Shown are:

FIG. 6, a block diagram of a reference scale including a conveyor system in accordance with various embodiments described herein.

DETAILED DESCRIPTION OF EMBODIMENTS

Figure 1:
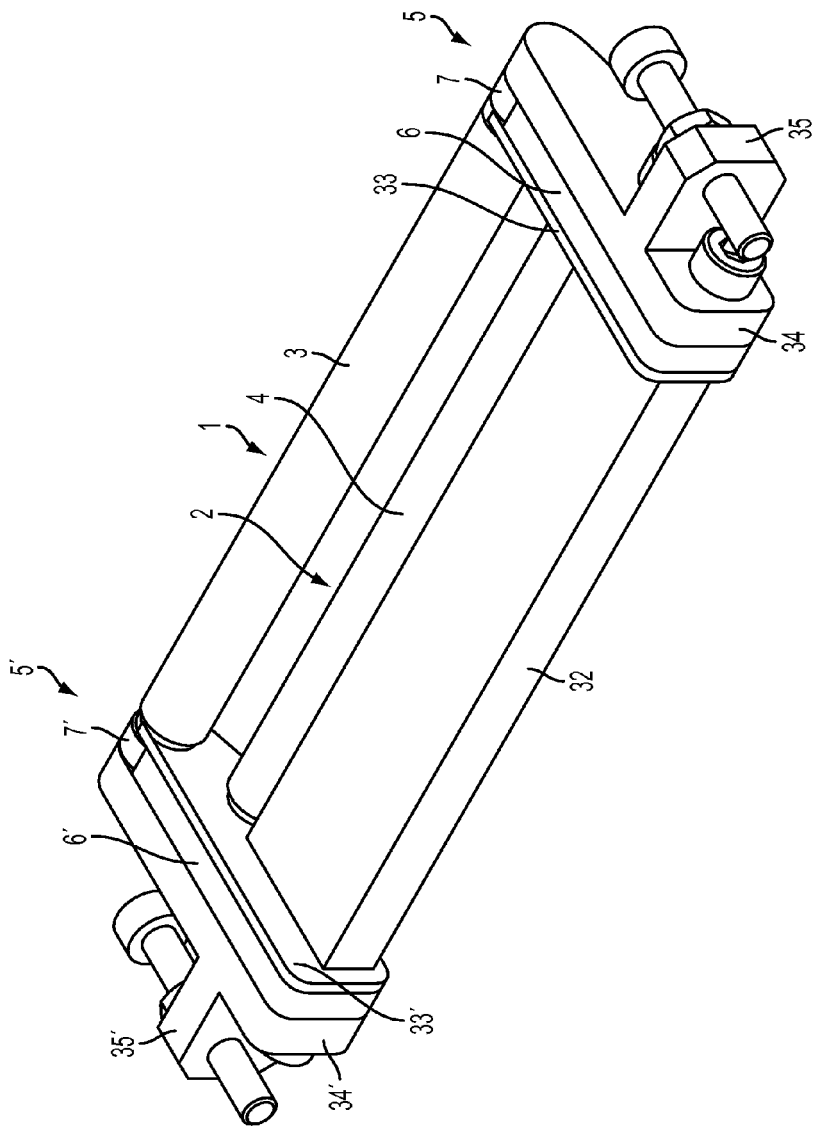
FIG. 1, a perspective illustration of rolls and the bearing arrangements thereof on an end region of a conveyor belt, the conveyor belt being removed, FIG. 2, a essential parts of the bearing arrangement according to FIG. 1 in a position parallel to the rotation axis of the rolls on a plane orthogonal to the rotation axis, FIG. 3, a schematic lateral view of an embodiment of the bearing carrier, FIG. 4, a further embodiment of the bearing carrier in a sectional view extending through the rotation axis of the roll, and FIG. 5, a view corresponding to FIG. 4 of an alternative embodiment.

It is the aim of the invention to create a bearing arrangement of the kind mentioned above, the space requirement of which is reduced in a direction orthogonal to the rotation axis.

According to the invention, this aim is achieved in that the azimuth angle corresponding to the circumferential region enclosed by the bearing receiving region is less than 360°, the pivot bearing in this circumferential region is tensioned relative to the bearing receiving region by the force resulting from the engagement between the roll and the revolving element, and in a free circumferential region of the pivot bearing opposite this enclosed circumferential region the projections of the bearing carrier and of the revolving element projected parallel to the rotation axis onto a plane orthogonal thereto do not intersect.

Accordingly, in the solution according to the invention the bearing receiving region has an open shape such that it encloses the circumference of the pivot bearing only partially. As a result, the pivot bearing in the free circumferential region thereof opposite the enclosed circumferential region is freely accessible and, for example, allows the bearing arrangement to completely converge on an adjoining roll.

Since the pivot bearing is tensioned relative to the bearing receiving region by the force resulting from the engagement between the roll and the revolving element, this bearing receiving region does not have to be configured in a positive connection with the pivot bearing. This enables a high level of design freedom regarding the shaping of the bearing carrier, and particularly of the bearing receiving region thereof. It enables a lot of leeway regarding the region in which the projections of the bearing carrier and of the revolving element do not intersect in the plane orthogonal to the rotation axis. The latter means that, in the event that the element revolving in engagement with the roll is a flexible, continuous conveyor element revolving about this roll and a further roll disposed at a distance thereof, a spacious area of the pivot bearing is available, as viewed laterally in the direction of the rotation axis, in which the bearing carrier does not jut into the orbit of the conveyor element. As a result, close convergence on the revolving conveying element can occur in this area. The latter can be a conveyor band, a conveyor belt, a conveyor strap, or a conveyor chain, for example, on the effectively conveying strand of which extending between the two rolls material to be conveyed is transported and, due to the close convergence of a connecting unit, can be transferred to the latter for further transport largely without interference. This feature is particularly important for reference scales, in which objects conveyed on an infeed belt are transferred to a downstream weighing belt, which is supported on a weighing device and thereby enables the weight of the objects to be determined during passage. An example reference scale 40 including a conveyor system 42 in accordance with various embodiments described herein is shown in FIG. 6.

According to an advantageous embodiment, the projections of the bearing carrier and of the revolving conveyor element do not intersect. In a lateral view in the direction of the rotation axis, in this embodiment the bearing carrier overall is located inside the orbit of the conveyor element, wherein it can approach the orbit with the edge thereof, however without intersecting it. In this way, the conveyor element is freely accessible on all sides in the entire region of the bearing carrier.

It is also part of the invention that the diameter of the circular cylindrical outer circumference of the pivot bearing substantially corresponds to the diameter of the roll. As long as the diameter of the pivot bearing is smaller than that of the roll, the pivot bearing does not constitute a hindrance for the maximum convergence of the roll on an adjoining roll in a direction orthogonal to the rotation axis. In this spirit, a diameter of the pivot bearing that corresponds to the diameter of the roll means the maximum possible bearing size that allows a maximum service life of the pivot bearing.

Advantageously, the invention is configured such that the bearing receiving region comprises two regions that are inclined at an angle relative to each other, between which the enclosed circumferential region of the pivot bearing can be supported. Due to the two regions inclined relative to each other, the pivot bearing is centered as if between two V-sides, and thus clearly defined in terms of the position thereof, in that it is loaded in the direction of the apex of the V-shape by the force resulting from the engagement between the roll and the element revolving thereon. This angle can be acute, obtuse, or square.

Since the pivot bearing is clamped to the bearing carrier solely by the force resulting from the engagement between the roll and the element revolving thereon, it loses the grip thereof if the revolving element is removed, for example for maintenance purposes. However, if it is desirable not to completely lose the cohesion between the pivot bearing and the bearing carrier in this case, it is provided according to a further concept that a stop device delimiting a degree of freedom of movement of the pivot bearing opposite the tensioning direction relative to the bearing carrier is provided. This stop device is preferably configured such that it allows a small distance of the pivot bearing from the bearing receiving region, which however is not so large that the pivot bearing can completely break away from the enclosure of the bearing receiving region, but remains held therein. This has the advantage that the centering of the pivot bearing occurs solely by the bearing receiving region and is not interfered with by the stop device.

An embodiment that is advantageous in this respect is to configure the azimuth angle corresponding to the circumferential region of the pivot bearing enclosed by the bearing receiving region larger than 180°, and to configure the distance between the free end regions of the bearing receiving region smaller than the diameter of the pivot bearing, said end regions being disposed opposite each other at the ends of this circumferential region and forming the stop device. Since the enclosure of the bearing receiving region covers more than 180° of the circumferential region of the pivot bearing and the distance of the free ends regions of the bearing receiving region is smaller than the diameter of the pivot bearing, the latter is held inside the bearing receiving region. If the free end regions of the bearing receiving region forming the stop device rest against the circumference of the pivot bearing, the degree of freedom of movement thereof is reduced to zero in the plane orthogonal to the rotation axis. The configuration, however, can be such that the free end regions of the bearing receiving region forming the stop device are disposed at a slight distance from the circumference of the pivot bearing in the operating position thereof clamped on the bearing receiving region. In this case, the pivot bearing is held in the bearing holder with little clearance for movement.

In an alternative embodiment, it is provided that the stop device comprises a stop, which is disposed opposite the pivot bearing on the side thereof facing away from the bearing receiving region and which can be brought in contact with the pivot bearing with the outer circumference thereof. Again, it is advantageous to dispose the stop such that it is located at a small distance from the circumference of the pivot bearing in the clamped state of the same in the bearing receiving region.

A further alternative is to provide the stop device with a first stop element in the form of an axial recess and with a second stop element in the form of a projection axially engaging in the recess with clearance on all sides, of which one is disposed on the bearing carrier and the other on an end of a shaft butt end of the roll disposed coaxially to the rotation axis and carrying the pivot bearing, said end pointing toward the bearing carrier. For example, the axial recess can be configured in a material region of the bearing carrier axially supporting the pivot bearing on the face side thereof facing away from the roll, and the projection engaging in this recess can be formed by a continuation of the shaft butt end jutting out beyond the face side of the bearing. Alternatively, the recess can be configured in the free end region of the shaft butt end facing away from the roll, and the projection jutting into the recess can extend from the material region of the bearing carrier axially supporting the face side of the pivot bearing facing away from the roll.

According to FIG. 1, two rolls 1, 2 having a circular cylindrical circumference 3, 4, which has a relatively large axial length compared to the radius thereof, are each rotatably supported in the regions of the axial ends thereof on a bearing arrangement 5, 5'. Each bearing arrangement 5, 5' comprises a bearing carrier 6, 6', which extends orthogonally to the rotation axes of the rolls 1, 2 and in which a pivot bearing 7, 7' used for the rotatable support of the roll 1, 2 is supported.

Figure 2:
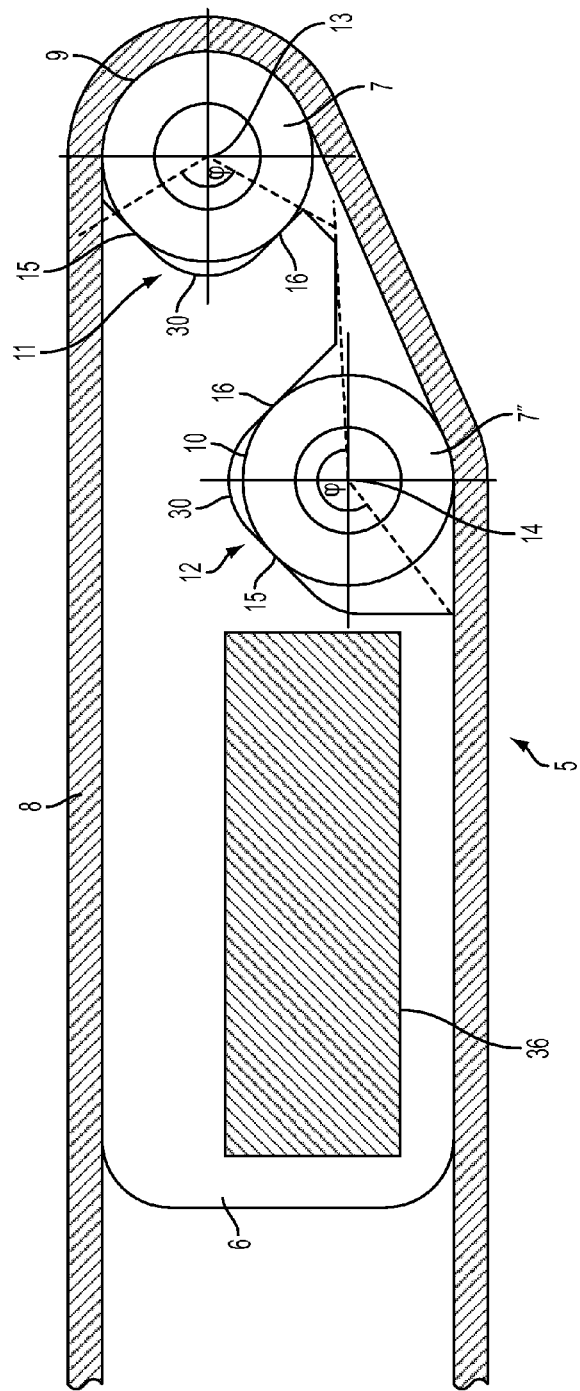

A conveyor belt 8, which can be seen in FIG. 2 and is removed in FIG. 1 for illustration purposes, is engaged in the rolls 1, 2. The conveyor belt 8 runs on the rolls 1, 2 on a continuous orbit, wherein the rolls 1, 2 bring about the deflection of the conveyor belt 8 at the right end of this orbit in FIG. 2. The deflection on the left end of the orbit, which is not shown in FIG. 2, can occur by an identical, or also a different roll arrangement, provided it only brings about the deflection of the orbit.

In FIG. 2, the essential parts of the bearing arrangement are projected parallel to the rotation axes of the rolls 1, 2 onto a plane orthogonal to these rotation axes, which is to say the drawing plane of FIG. 2. In it, the projected outer circumferences 9, 10 of the pivot bearings 7, 7" are located congruent on the projections of the outer circumferences 3, 4 of the rolls 1, 2 because in the illustrated embodiment the diameters of the rolls 1, 2 and of the pivot bearings 7, 7', 7" agree.

According to FIG. 2, in the bearing carrier 6, as well as in the bearing region 6' opposite thereof on the other axial end of the rolls 1, 2 according to FIG. 1, a bearing receiving region 11 pointing toward the pivot bearing 7 of the roll 1 and a bearing receiving region 12 pointing toward the pivot bearing 7" of the roll 2 are configured. The bearing receiving regions 11, 12 of the bearing carriers 6, 6' are open toward the outside and, as viewed from the rotation axis 13, 14 of the roll 1 or 2, appear at an azimuth angle φ, the sides of which are shown as dotted lines, of less than 360°. The pivot bearings 7, 7" are tensioned relative to the bearing receiving region 11 or 12 by the force resulting from the engagement between the respective roll 1 or 2 and the conveyor belt 8 revolving thereon and are thus fixed.

As is apparent from FIG. 2, the end region of the circumference 9 of the pivot bearing 7 enclosed by the bearing receiving region 11 corresponds to an azimuth angle φ, which is smaller than 180°, while on the pivot bearing 7" of the roll 2 the circumferential region of the roll 2 enclosed by the bearing receiving region 12 corresponds to an azimuth angle γ of more than 180°. It is also apparent that in the free circumferential regions opposite these enclosed circumferential regions no intersection occurs between the projection of the bearing carrier 6 and the projection of the conveyor belt 8. This means that in these regions the bearing carriers 6, 6' do not impede the convergence of the conveyor belt 8 on an adjoining unit. It is further apparent from FIG. 2 that in this embodiment the bearing carriers 6, 6' are even located inside the orbit of the conveyor belt 8 along the entire circumferential contour projected on the drawing plane, even though they extend to the orbit in some sections.

Each of the two bearing receiving regions 11, 12 shown in FIG. 2 is configured such that the pivot bearing 7 or 7' rests therein in exactly two regions 15, 16 inclined relative to each other at an angle. In the embodiment shown, this angle is smaller than 90°, however it can also be obtuse or 90°. These inclined, straight-lined regions 15, 16 appear, as viewed from the respective rotation axis 13, 14, at an azimuth angle of less than 180°. At the two contact points thereof, they extend tangentially to the circumference 9, 10 of the respective pivot bearing 7, 7". Due to this two-point engagement, in which the pivot bearing 7, 7" is held with the bearing receiving region 11 or 12 thereof in contact by the resulting force, the pivot bearing is exactly positioned in a clearly defined manner.

Figure 3:
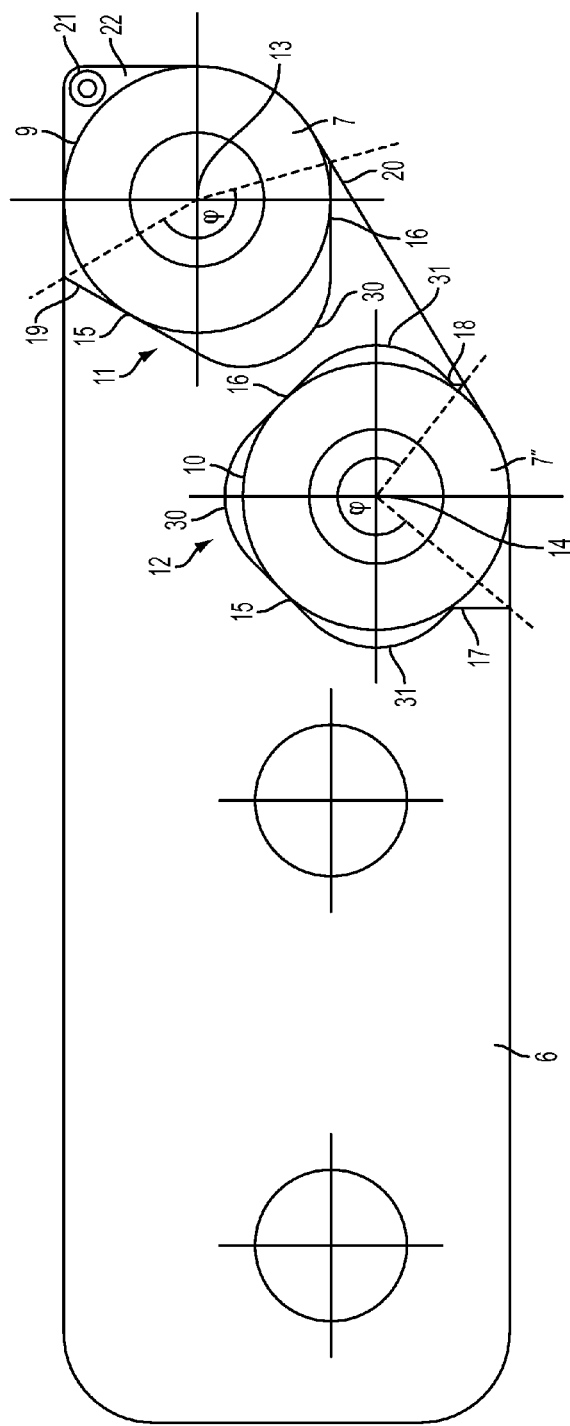

The relationships explained based on FIG. 2 are also present in the embodiment of the bearing carrier 6 illustrated in FIG. 3, the view of which corresponds to the illustration of FIG. 2, wherein only the conveyor belt is not shown. For this reason, in FIG. 3 the same reference numerals are used for elements that correspond to the elements of FIG. 2. Compared to the embodiment illustrated in FIG. 2, the embodiment shown in FIG. 3 has the added characteristic that the cohesion between the rolls and the bearing carriers 6, 6' of the pivot bearings 7, 7', 7" is not lost if, for example for maintenance purposes, the conveyor belt 8 is removed and thereby the force that tensions the pivot bearings 7, 7', 7" relative to the bearing receiving regions 11, 12 thereof is eliminated.

For this purpose, the two free end regions 17, 18 of the bearing receiving regions 12 enclosing the pivot bearing 7" of the roll 2, the enclosure of which corresponds to an azimuth angle φ of more than 180°, have converged on each other so much that the distance from each other is smaller than the diameter of the pivot bearing 7". Even if these free end regions 17, 18 do not rest against the circumference 9 of the pivot bearing 7", but contrary to the illustration according to FIG. 3 end at a small distance from the circumference 10 of the pivot bearing 7", the latter is held in the bearing receiving region 12 when the conveyor belt (see FIG. 2) is removed, thereby eliminating the force acting by the same on the pivot bearing 7" in the direction of the inclined regions 15, 16.

On the bearing receiving region 11 of the pivot bearing 7 in FIG. 3, the azimuth angle φ corresponding to the enclosure is smaller than 180° and the distance of the free end regions 19, of the bearing receiving region 11 from each other is larger than the diameter of the pivot bearing 7. In this case, the stop device securing the cohesion between the pivot bearing 7 and the bearing carrier 6 is a pin-shaped stop 21, which extends axially parallel to the rotation axis 13 of the roll 1 and is disposed opposite the circumference 9 of the pivot bearing 7 on the side thereof facing away from the bearing receiving region 11 at a small distance. If after removing the conveyor belt 8 (see FIG. 2) the pivot bearing 7 is no longer tensioned relative to the regions 15, 16 of the bearing receiving region 11 inclined relative to each other, the pivot bearing 17 can only come clear from the inclined regions 15, 16 until the circumference 9 thereof butts the pin-shaped stop 21. As a result, the pivot bearing 7 remains held at the bearing receiving region 11 thereof. The pin-shaped stop 21 is fixed to a material region 22 of the bearing carrier 6 extending across the radial face side facing away from the roll 1. At the same time, the material region 22 prevents an axial displacement of the pivot bearing 7 relative to the bearing carrier 6 thereof.

Figure 4:
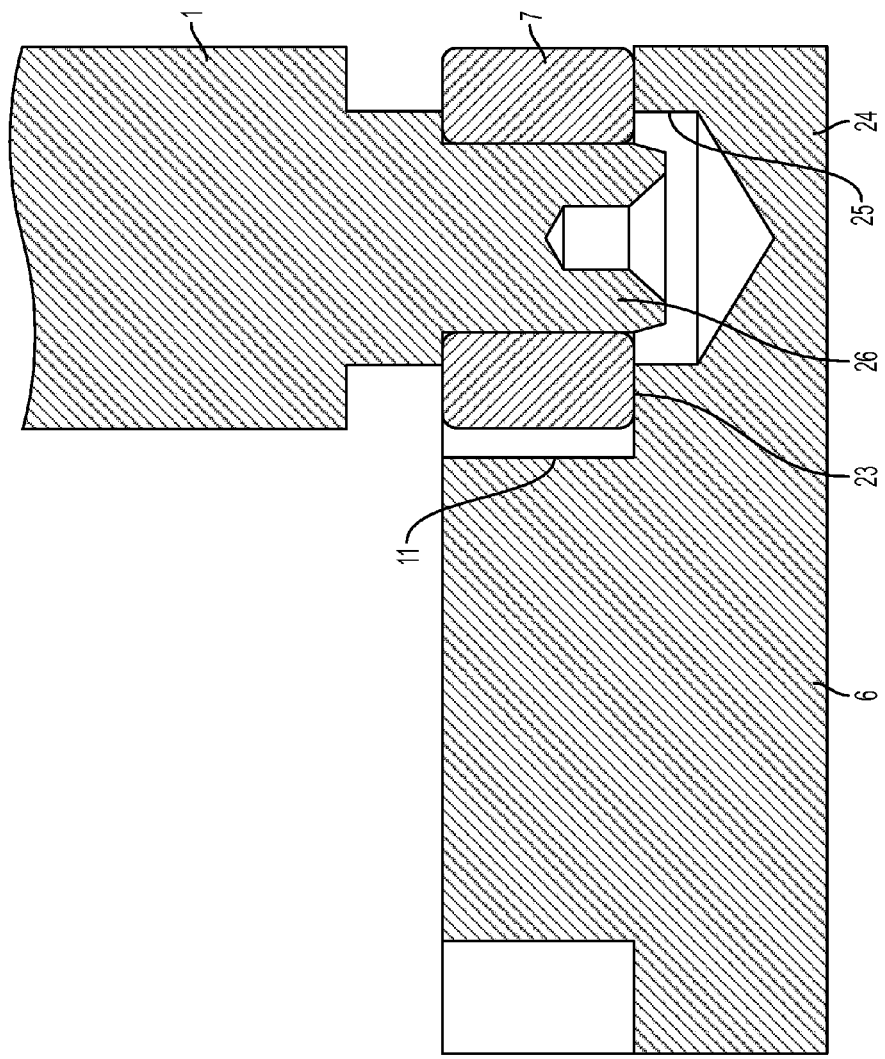

FIG. 4, in which the same reference numerals are used for elements corresponding to the embodiments in FIGS. 1 to 3, shows an alternative embodiment of the stop device. For this purpose, the bearing carrier 6 comprises a material region 24 extending across the radial face side 23 of the pivot bearing 7 facing away from the roll 1, a recess 25 that is configured coaxially to the rotation axis of the roll 1 being configured in said material region. The diameter of the recess 25 is larger than the diameter of a shaft butt end 26, which is configured on the roll 1 and on which the pivot bearing 7 is located. The shaft butt end 26 protrudes over the radial face side 23 of the pivot bearing 7 and juts into the recess 25 with clearance on all sides, whereby the pivot bearing 7 with the roll 1 is held on the bearing carrier 6 because the shaft butt end 26 butts the wall of the recess 25 upon a displacement of the pivot bearing 7.

Figure 5:
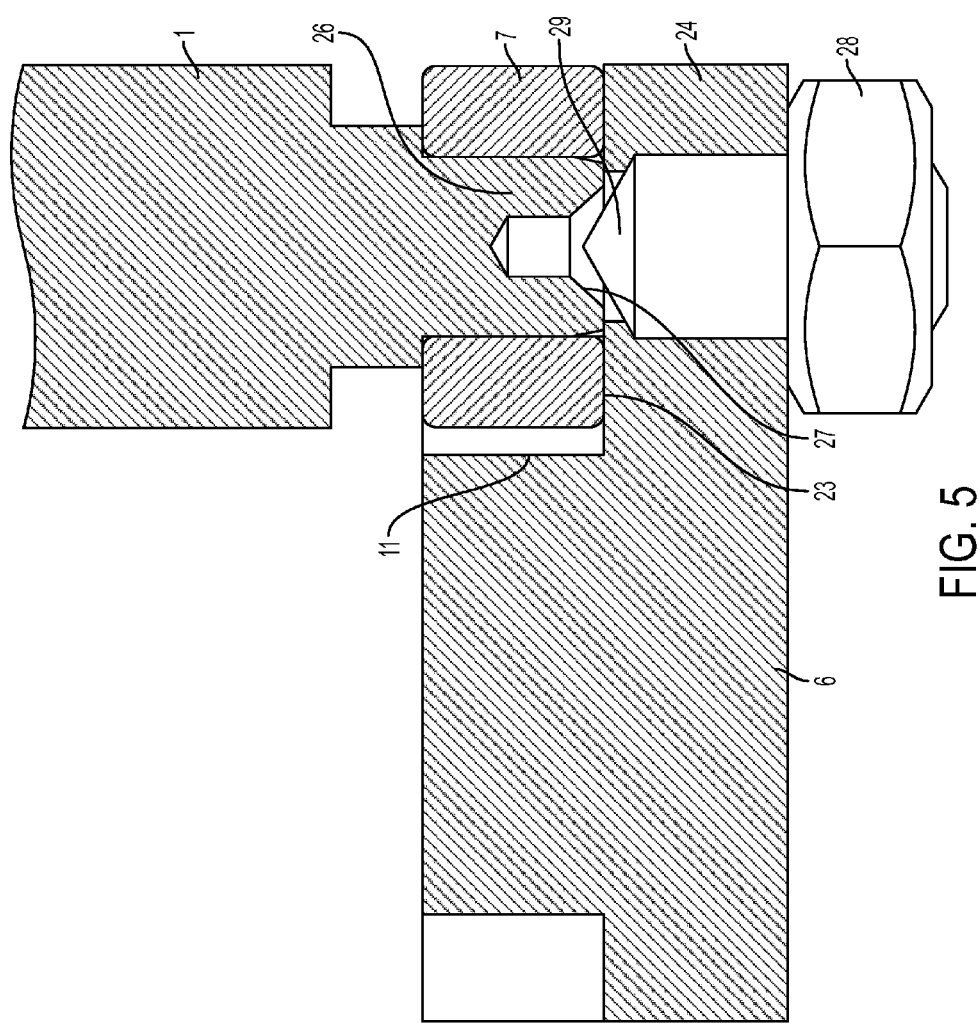

While in FIG. 4 the recess 25 of the stop device is configured in the material region 24 and the projection axially engaging in said recess is formed by the region of the shaft butt end 26 protruding over the radial face side 23 of the pivot bearing 7, the opposite is true for the embodiment illustrated in FIG. 5. There, the end of the shaft butt end 26 on the face side ends flush with the radial face side 23 of the pivot bearing 7 over which the material region 24 extends. From this face-side end of the shaft butt end 26, a recess 27 that is configured coaxially to the rotation axis of the rolls is formed in said butt end, the recess opening conically toward the free face side of the shaft butt end 26. A projection, which is formed by a screw bolt 28 that is screwed into the material region 24 and the end region 29 of which projecting into the recess 27 tapers conically in the direction of the recess 27, juts into this recess 27 with clearance on all sides. Also in this stop device 27, 29, the pivot bearing 27 with the roll 1 is held on the bearing carrier 6 in that during a displacement the end region 29 of the screw bolt 28 butts the wall of the recess 27.

It is further apparent from FIGS. 2 and 3 that the inclined regions 15, 16 of the bearing receiving regions 11, 12 having tangential contact with the circumference 9, 10 of the pivot bearings 7, 7' are connected at the ends thereof disposed opposite the free end regions 17, 18, 19, of these bearing regions to each other by an arched shape 30, which extends at a distance from the circumference 9, 10 of the respective pivot bearing 7, 7". Furthermore, in the bearing receiving region 12 shown in FIG. 3, the free end regions 17, 18 thereof are connected to the ends of the regions 15, 16 inclined relative to each other and pointing toward said regions by a similar arched shape 31.

It is apparent from FIG. 1 that the two bearing arrangements 5, 5' are rigidly connected to each other by a cross-member 32 extending parallel to the rotation axes of the rolls 1, 2. Lateral plates 33, 33', which in a circumferential region pointing toward the cross-member 32 rest against the face sides of the pivot bearings 7, 7' pointing toward the rolls 1, 2 and thereby secure them against axial displacement in the bearing carriers 6, 6', extend along the insides of the bearing carriers 6, 6' pointing toward the cross-member 32.

Lateral carriers 34, 34' are attached to the outsides of the bearing carriers 6, 6' disposed opposite the cross-member 32, said carriers extending across the face sides of the pivot bearings 7, 7' facing away from the rolls 1, 2, however not protruding over the free circumferential regions thereof. These lateral carriers have lateral fastening elements 35, 35', with which the roll arrangement can be fixed inside an overall device. These lateral fastening elements are symbolized in the projection illustration according to FIG. 2 by a hatched rectangle 36.

The invention claimed is:

1. A conveyor system for transporting a material to be conveyed along a horizontal transport direction, having:
   a first roll being rotatable around a rotation axis;
   a flexible, continuous conveyor element revolving in engagement with a circumference of said first roll; and
   a bearing arrangement for a pivot bearing of said first roll, said bearing arrangement comprising a bearing carrier extending orthogonally to said rotation axis, said bearing carrier having a bearing receiving region azimuthally enclosing said pivot bearing in the bearing receiving region of a radially outer circumference thereof, with an azimuth angle corresponding to an enclosed radially circumferential region defined as being enclosed by the bearing receiving region is less than 360°, the pivot bearing in the enclosed radially circumferential region being tensioned relative to the bearing receiving region by the force resulting from the engagement between the first roll and said conveyor element, and wherein a free circumferential region of the pivot bearing is defined as being opposite said enclosed radially circumferential region, said free circumferential region comprising a portion of a continuous orbit extending orthogonal to said horizontal transport direction and to said rotation axis, wherein, within said free circumferential region, the bearing carrier and the conveyor element do not intersect when viewing their projections onto a plane orthogonal to the rotation axis, such as to allow said bearing arrangement to completely converge on an adjoining roll;
   wherein said conveyor element runs on said continuous orbit, said first roll brings about the deflection of said conveyor element at one end of said continuous orbit, and wherein said conveyor element runs on a second roll disposed at a distance from said first roll, said second roll bringing about the deflection at an other end of the continuous orbit, such that said horizontal transport direction of said material to be conveyed corresponds to a horizontal extension of said conveyor element between said first and said second roll in an upper portion of said continuous orbit.

2. The conveyor system according to claim 1, characterized in that the diameter of a circular cylindrical outer circumference of the pivot bearing corresponds to a diameter of said first roll.

3. The conveyor system according to claim 1, characterized in that the conveyor element comprises a conveyor band, a conveyor belt, a conveyor strap, or a conveyor chain.

4. A conveyor system according to claim 1, characterized in that the bearing receiving region comprises two regions, which are inclined relative to each other at an angle and between which the enclosed radially circumferential region of the pivot bearing can be supported.

5. The conveyor system according to any one of claims 1, 2, 3, or 4, being incorporated into a reference scale.

6. The conveyor system according to claim 1, characterized in that the bearing carrier and of the continuous conveyor element do not intersect when viewing their projections onto the plane orthogonal to the rotation axis.

7. A bearing arrangement according to claim 1, characterized in that a stop device delimiting a degree of freedom of movement of the pivot bearing opposite a tensioning direction relative to the bearing carrier is provided.

8. The bearing arrangement according to claim 7, characterized in that the azimuth angle corresponding to the enclosed radially circumferential region of the pivot bearing enclosed by the bearing receiving region is larger than 180°, and the distance between free end regions of the bearing receiving region is smaller than the diameter of the pivot bearing, said free end regions being disposed opposite each other at the ends of the enclosed radially circumferential region and forming the stop device.

9. The bearing arrangement according to claim 7, characterized in that the stop device comprises a stop, which is disposed opposite the pivot bearing on the side thereof facing away from the bearing receiving region and which can be brought in contact with the pivot bearing with the outer circumference thereof.

10. The bearing arrangement according to claim 7, characterized in that the stop device is provided with a first stop element in the form of an axial recess and with a second stop element in the form of a projection axially engaging in the recess with clearance on all sides, of which one is disposed on the bearing carrier and the other on an end of a shaft butt end of the first roll arranged coaxially to the rotation axis and carrying the pivot bearing, said end pointing toward the bearing carrier.

* * * * *